3,311,617
6-CYANO STEROIDAL ENOL ETHERS AND PROCESS FOR PREPARING SAME
Vladimir Petrow and John Patrick Yardley, London, England, assignors to The British Drug Houses Limited, London, England
No Drawing. Filed June 18, 1964, Ser. No. 376,251
Claims priority, application Great Britain, June 20, 1963, 24,547/63
29 Claims. (Cl. 260—239.55)

This invention is for improvements in or relating to organic compounds, and has particular reference to 6-cyano steroidal enol ethers.

It is an object of the present invention to provide the 6-cyano derivatives of steroidal 3-enol ethers (derived from 4-en-3-oxo steroids) which may be represented (apart from substituents in Rings A, B, C and D and unsaturation in Rings B, C and D) by partial Formula I

where R is an alkyl, aralkyl or cycloalkyl radical containing up to 11 carbon atoms.

The compounds of the present invention may be regarded as the 3-enol ethers of 6-cyano-3-oxo-$\Delta^4$-steroids. 6-cyano-3-oxo-$\Delta^4$-steroids are well known to those skilled in the art on account of their biological properties. In general, the biological properties of the 3-enol ethers of the present invention will resemble those of the corresponding 6-cyano-3-oxo-$\Delta^4$-steroids, but there will be quantitative differences between them. Thus, for example, the 3-enol ethers of 6-cyano corticoids can be more potent anti-inflammatory compounds than the corresponding 3-oxo-$\Delta$4-steroids. The 3-enol ethers of the pregnane and androstane series can have a more favourable progestational/anti-ovulatory ratio than the corresponding 3-ketones. Moreover the 3-enol ethers of the androstane series can have enhanced anabolic/androgenic indices with respect to the corresponding 3-ketones.

According to the present invention there is provided a process for the preparation of a 3-enol ether of a 6-cyano-3-oxo-$\Delta^4$-steroid having in Rings A and B of the steroid nucleus the structure

where R is an alkyl, cycloalkyl or aralkyl radical containing up to 11 carbon atoms which process comprises reacting the corresponding 3-enol ether of a 6-formyl-3-oxo-$\Delta^4$-steroid, having in Rings A and B of the steroid nucleus the structure

where R has the same meaning as above, with hydroxylamine to form an oxime having in Rings A and B of the steroid nucleus the structure

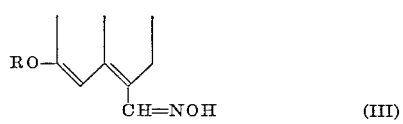

where R has the same meaning as above, and treating the oxime with a dehydrating agent.

The starting materials of the present invention are the corresponding 6-formyl enol ethers (II), the preparation of which is described in our U.S. Patent No. 3,114,750. The first stage of the present invention comprising the conversion of the 6-formyl steroids into the corresponding oximes (III) may be carried out by treating the 6-formyl 3-enol ether with a slight excess over a molar equivalent of hydroxylamine hydrochloride and sodium acetate in an aqueous lower aliphatic alcohol. Alternatively, a weakly basic solvent such, for example, as pyridine may be employed. A variety of reaction conditions may be used; generally, a period of ½ to 2 hours at 100° C., or 12 to 24 hours at ambient temperature will lead to high yields of the 6-hydroxyiminomethyl derivative (III). The products may separate from the reaction mixture as solids when the solution is cooled, or may be precipitated from the mixture by dilution with water. The derivatives (III) may, if desired, be purified by crystallisation from a suitable solvent in the usual manner.

Conversion of the hydroxyiminomethyl derivatives (III) into the 6-cyano derivatives (I) may be achieved by contacting with a dehydrating agent consisting of an acid anhydride under conditions to form an acyloxyiminomethyl enol ether having the partial formula

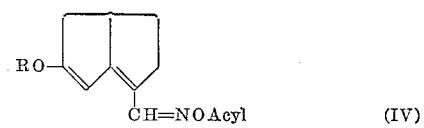

where R has the same meaning as above and heating to eliminate the elements of the corresponding acid. Thus, for example, the acetoxyiminomethyl enol ether (IV) [where R is as defined above and acyl is acetyl] may be prepared from the hydroxyiminomethyl enol ether (III) by, for example, treatment with acetic anhydride in a weakly basic solvent such as pyridine. A wide variety of reaction conditions may be used. Thus the mixture may be heated to 100° C. for a period of ½ to 2 hours, or it may be maintained at ambient temperature for 12 to 48 hours. The product may be obtained by diluting the reaction mixture with water, and either filtering, or extracting with a water-immiscible solvent. The product may, if desired, be purified by conventional procedures, or it may be used in the crude state for the following stage. The acetoxyiminomethyl enol ether may be heated in the dry state [in an inert atmosphere such, for example, as nitrogen if desired], at a temperature sufficient to eliminate the elements of acetic acid and form the desired 6-cyano enol ether (I). This temperature will vary from compound to compound, and may be determined by noting the temperature at which effervescence occurs; it will generally be in the range of 150 to 200° C. The reaction may alternatively be carried out in solution in an inert, high boiling-point solvent such, for example, as diglyme, which is heated to its boiling point until reaction is complete, generally from 1 to 30 minutes.

Alternatively, the two final stages may be carried out simultaneously. Thus the hydroxyiminomethyl enol ether (III) may be heated under reflux with an acid anhydride and preferably with acetic anhydride, preferably in an inert atmosphere and in the presence of a small quantity of, for example, an alkali metal acetate. Conversion into the 6-cyano enol ether (I) will, in general, be complete within 6 hours. The product may be obtained by pouring the cooled mixture into water and either filtering or extracting with a water-immiscible solvent.

The conversion of (III) into (I) may also be effected by the use of other dehydrating agents such for example as acid halides and in particular, acetylchloride, thionyl chloride, phosphorus halides and particularly phosphorus oxychloride (in organic solvents and in the presence of bases such as pyridine if so desired). Other dehydrating agents include hydrogen chloride and polyphosphoric acid in an organic solvent. The use of such dehydrating agents will naturally be avoided by those skilled in the art when dealing with 6-hydroxyiminomethyl derivatives containing groups or residues susceptible to such reagents. The choice of method used will clearly depend on the nature of the steroidal starting material.

The process of the present invention may be applied to a wide variety of steroidal starting materials of the androstane, 19-norandrostane (oestrane), pregnane, and 19-norpregnane series and their D-homo analogues which may additionally be substituted in Rings A, B, C and D and have unsaturation in Rings B, C and D. Thus the process is unaffected by the presence of (1) Hydroxyl groups and their acyl derivatives and in particular by such groups at $C_{11}$, $C_{12}$, $C_{14}$, $C_{15}$, $C_{16}$, $C_{17}$, $C_{18}$, $C_{19}$, $C_{20}$ and $C_{21}$. If such hydroxyl groups are acylated during the process of the present invention they may be regenerated by suitable hydrolytic procedures if so desired.
(2) Alkyloxy groups, and in particular methoxy groups at $C_{16}$ and $C_{17}$, as well as the cyclic ethers and esters derived from $C_{16}$, $C_{17}$ diols by reaction with carbonyl compounds including acetone and substituted derivatives thereof.
(3) Alkyl groups, and in particular methyl groups at $C_1$, $C_2$, $C_9$, $C_{11}$, $C_{12}$, $C_{14}$, $C_{15}$, $C_{16}$, $C_{17}$, $C_{18}$, $C_{19}$, $C_{20}$ and $C_{21}$.
(4) Alkenyl and alkynyl groups, and in particular methylene and halomethylene, cyclomethylene and halo and carboxy cyclomethylene, vinyl, ethynyl and substituted ethynyl groups particularly at $C_{16}$ and $C_{17}$. Substituted ethynyl groups may include those in which the ethynylenic hydrogen atom is replaced by alkyl, fluorine, chlorine, bromine, trifluoromethyl and hydroxymethyl groups.
(5) Halogens, and in particular fluorine and chlorine at $C_9$, $C_{12}$, $C_{16}$, $C_{17}$ and $C_{21}$ including $C_9$, $C_{11}$ dihalogen compounds.
(6) Hydroxyalkyl, alkyloxyalkyl, chloro and fluoro alkyl groups for example at $C_2$ and $C_{16}$.
(7) Unsaturated linkages, and in particular double bonds at $C_7$, $C_{9(11)}$, $C_{11}$, $C_{12(13)}$, $C_{13(14)}$, $C_{14}$, $C_{15}$, $C_{16}$, $C_{17(20)}$, $C_{20(21)}$.
(8) Carboxy and carbalkoxy groups, for example, at $C_{16}$, $C_{17}$ and $C_{20}$.
(9) Lactone rings including spirolactone rings attached to $C_{17}$, and compounds in which Ring D comprises a lactone ring.
(10) Alkoxyimino groups, including methoxyimino at $C_{17}$ and $C_{20}$.
(11) Carbonyl groups at $C_{11}$ and at $C_{20}$ [when present in the grouping

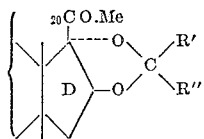

where
R' may be hydrogen, lower alkyl and aryl R" may be lower alkyl and aryl].

Certain carbonyl groups such, for example, as those at $C_{17}$ and $C_{20}$ when present in the groupings

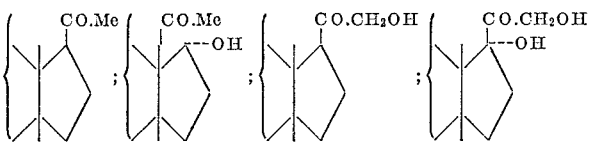

will, in general, interfere with the process of the present invention and should be protected and subsequently regenerated. Such protection may be afforded by standard methods such as prior conversion into the ethylene ketal, and in the case of the hydroxylated ketones, by conversion into 17α- and 21-acyl derivatives. The corticoid side-chain may be converted into a 17α- or 21-monoacyl, or a 17α-, 21-diacyl derivative, or it may be converted into a 17α,20:20,21-bismethylenedioxy derivative. In general, however, such protection will already have been effected during the preparation of the 6-formyl starting materials (see our U.S. Patent No. 3,114,750) so that regeneration may be carried out at the completion of the process, if so desired.

The process of the invention may be used for the preparation of 6-cyano-3-enol ethers derived, inter alia, from the following steroidal 3-oxo-4-enes and acyl derivatives thereof and D-homo derivatives thereof:

Testosterone, 2-methyl testosterone, 17α-methyl, ethyl, vinyl, alkyl, butenyl, ethynyl testosterone, 17α-propynyl testosterone, 17α-chlorethynyl, bromoethynyl, trifluoromethyl ethynyl testosterone and their 9(11)-dehydro, 11-oxo and 11-hydroxy derivatives, and the 19-nor derivatives thereof and the 17-ethers of the foregoing 17β-hydroxy compounds Androst-4-ene-3,17-dione and its 2-methyl, 16-methyl and 2,16-dimethyl derivatives, and their 11-oxo, 11-hydroxy and the 9(11)-dehydro derivatives 17α-acyloxy, 17α-chloro and 17α-fluoro and 17α-methyl, progesterone and their 7-dehydro, 9(11)-dehydro, 12-dehydro, 11-oxo and 11-hydroxy derivatives 16-methyl-17α-acyloxy progesterone and its 9(11)-dehydro, 11-oxo and 11-hydroxy derivatives 21-fluoro-16-methyl-17α-acyloxy progesterone and their 9(11)-dehydro, 11-oxo and 11-hydroxy derivatives 16-methylene and 16-halomethylene-17α-acyloxy-progesterones and their 9(11)-dehydro, 11-oxo and 11-hydroxy derivatives 16-ethylidene and 16-haloethylidene-17α-acyloxy-progesterones and the 9(11)-dehydro, 11-oxo and 11-hydroxy derivatives thereof 21-fluoro-16-methylene [halomethylene] - 17α - acyloxy progesterones and their 9(11)-dehydro, 11-oxo and 11-hydroxy derivatives 16α,17α-isopropylidenedioxy progesterone and its 9(11)-dehydro, 11-oxo and 11-hydroxy derivatives Cortisone and hydrocortisone and their 16-methyl, 21-methyl, 16-methylene and 16-haloalkyl and 16-halomethylene derivatives and bismethylenedioxy derivatives thereof 16α-hydroxy cortisone and 16α-hydroxyhydrocortisone and their condensation products with carbonyl compounds including the 16α,17α - isopropylidenedioxy derivatives 17α,21-dihydroxy progesterone and its 9(11)-dehydro derivative and bismethylenedioxy derivatives thereof The 16-methyl, 21-methyl 16-methylene and 16-halomethylene derivatives of 17α,21-dihydroxy progesterone and their 9(11)-dehydro and bismethylenedioxy derivatives 16α,17α,21 - trihydroxypregna-4,9(11)-diene-3,20 - dione and its 16α,17α-isopropylidenedioxy derivatives 21-fluoro-17α-hydroxypregna-4,9(11)-diene-3,20-dione, its 16α-hydroxy derivative and the condensation products of the last compound with carbonyl compounds including acetone 21-fluoro-17α-hydroxypregn-4-ene-3,11,20-trione, its 16α-hydroxy derivative and the 16α,17α-acetonide thereof 21-fluoro-11,17α-dihydroxypregn-4-ene-3,20-dione, its 16α-hydroxy derivative and the 16α,17α-acetonide thereof 21-fluoro-17α-acyloxyprogesterone Progesterone and its 9(11)-dehydro, 11-oxo and 11-hydroxy derivatives 16-methylprogesterone, 16α,17α-cyclomethylene - progesterone, 16α,17α - dihalocyclomethylene - progesterone, 16α,17α-cycloethylidene progesterone, 21-fluoroprogesterone and 19-nor progesterone 21-hydroxypregna-4,17- dien-3-one and its 9(11) dehydro, 11-oxo and 11-hydroxy derivatives
3-oxopregna-4,17-dien-21-oic acid esters and their 9(11)-dehydro, 11-oxo and 11-hydroxy derivatives
Diosgenone
17-cyano-17-hydroxyandrost-4-en-3-one
16-methyl-16-dehydroprogesterone
16-cyano progesterone
16-carbalkoxy progesterone
16-hydroxymethyl and halomethyl progesterone
21-fluoro progesterone
3-(3-oxo-17β-hydroxyandrost-4-en-17α-yl) propionic acid γ-lactone
Testololactone and its 16-alkyl derivatives
16-fluoro corticoids and androstane derivatives
9β,10α-progesterone and derivatives thereof
The 9α-fluoro derivatives of 11β-hydroxy and 11-oxo steroids named in the foregoing list of compounds Following is a description by way of example of methods of carrying the invention into effect; the melting points reported were determined under B.P. conditions.

EXAMPLE 1

Preparation of 17β-acetoxy-6-cyano-3-methoxyandrosta-3,5-diene

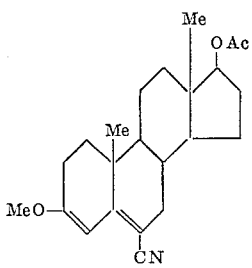

A mixture of 17β-acetoxy-6-formyl-3-methoxyandrosta-3,5-diene (1 g.), hydroxylamine hydrochloride (0.2 g.) and sodium acetate (0.4 g.) in ethanol (40 ml.) and water (10 ml.) was stirred at room temperature overnight. The solution was diluted with water and the precipitated solid was crystallised from chloroform-methanol to give 17β - acetoxy-6-hydroxyiminomethyl-3-methoxyandrostra-3,5-diene, M.P. 184–186° C., decomp., $[\alpha]_D^{30}$ —266.3° (c., 1.3 in chloroform), $\lambda_{max.}^{EtOH}$ 217 mμ ($\epsilon$ 8,870) and 293 mμ ($\epsilon$ 21,580)

The foregoing oxime was acetylated by treatment with acetic anhydride and pyridine at room temperature for 48 hours. 17β-acetoxy - 6-acetoxyiminomethyl-3-methoxyandrostra-3,5-diene formed rods from methanol, M.P. 117.5° C., $[\alpha]_D^{25}$ —212.4° (c., 1.0 in chloroform), $\lambda_{max.}^{EtOH}$ 224 mμ ($\epsilon$ 10,650) and 315 mμ ($\epsilon$ 21,400)

A solution of the foregoing product (1 g.) in diglyme (10 ml.) was heated to the boiling point for 2 minutes. Dilution of the cooled solution with water and crystallisation of the precipitated solid from chloroform-methanol gave 17β-acetoxy-6-cyano-3-methoxyandrosta-3,5 - diene, M.P. 197° C., $[\alpha]_D^{24}$ —147.7° (c., 1.0 in chloroform), $\lambda_{max.}^{EtOH}$ 282 mμ ($\epsilon$ 19,360)

$\gamma_{max.}$ 2225, 1639 and 1595 cm.$^{-1}$.

The compound has claudogenic activity.

EXAMPLE 2

Preparation of 17β-acetoxy-6-cyano-3-methoxyoestra-3,5-diene

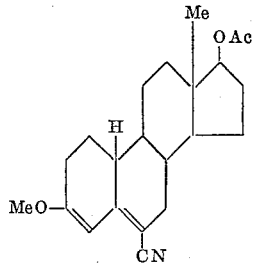

A mixture of hydroxylamine hydrochloride (5 g.), sodium acetate (10 g.), 17β-acetoxy-6-formyl-3-methoxyoestra-3,5-diene (5 g.) and ethanol (125 ml.) was heated under reflux for ½ hour. Dilution with water afforded a solid which was crystallised from methanol to give 17β-acetoxy-6-hydroxyiminomethyl-3-methoxyoestra - 3,5-diene as needles, M.P. 190–191° C., decomp. $[\alpha]_D^{26}$ —268° (c., 1.35 in chloroform)

$\lambda_{max.}^{EtOH}$ 218 mμ ($\epsilon$ 8,590) and 294–5 mμ ($\epsilon$ 21,220)

A mixture of the foregoing product (2 g.), sodium acetate (anhydrous, 0.25 g.) and acetic anhydride (35 ml.) was heated under reflux for 3 hours. The cooled solution was poured into water and the precipitated solid was crystallised from methanol to give 17β-acetoxy-6-cyano-3-methoxyoestra-3,5-diene as laths, M.P. 159° C., $[\alpha]_D^{25}$ —197° (c., 1.0 in chloroform)

$\lambda_{max.}^{EtOH}$ 283 mμ ($\epsilon$ 19,055)

$\gamma_{max.}$ 2220, 1640 and 1590 cm.$^{-1}$.

The compound has claudogenic activity.

EXAMPLE 3

Preparation of 21-acetoxy-6-cyano-11β-formyloxy - 17α-hydroxy-3-methoxypregna-3,5-diene-20-one

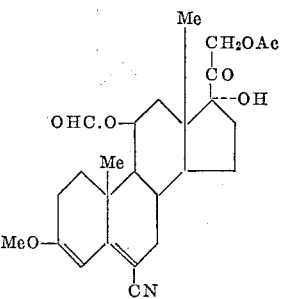

A mixture of 21-acetoxy-6-formyl-11β-formyloxy-17α-hydroxy-3-methoxypregna-3,5-dien-20-one (7.05 g.), hydroxylamine hydrochloride (1.12 g.) and sodium acetate (2.25 g.) in ethanol (150 ml.) and water (30 ml.) was heated under reflux for 35 minutes. The cooled solution was diluted with water and the precipitated solid was crystallised from chloroform-methanol to give 21-acetoxy-11β-formyloxy-17α-hydroxy-6 - hydroxyiminomethyl - 3-methoxypregna-3,5-dien-20-one, M.P. 210–218° C. decomp. $[\alpha]_D^{24}$ —21.8° (c., 1.0 in chloroform)

$\lambda_{max.}^{EtOH}$ 216 mμ ($\epsilon$ 9,830) and 294 mμ ($\epsilon$ 21,140)

A solution of the foregoing oxime (2 g.) was treated with acetic anhydride and pyridine at room temperature overnight. The mixture was poured into water, the precipitated solid was collected, washed with water and dried. It was then heated, under nitrogen, to 170° C. for 2 minutes. Crystallisation of the residue from chloroform-methanol gave 21 - acetoxy-6-cyano-11β-formyloxy-17α-hydroxy - 3 - methoxypregna - 3,5 - dien - 20 - one as needles M.P. 268–270.5° C., $[\alpha]_D^{23}$ +4.3° (c., 0.5 in chloroform)

$\lambda_{max.}^{EtOH}$ 282 m$\mu$ ($\epsilon$ 19,470)

$\nu_{max.}$ 2195, 1628 and 1595 cm.$^{-1}$.

The compound has antiendotoxic and claudogenic activity.

EXAMPLE 4

Preparation of 6-cyano-17α,21-diacetoxy-11β-formyloxy-3-methoxypregna-3,5-dien-20-one

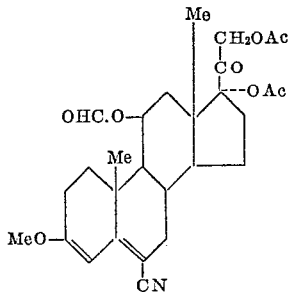

A solution of 21-acetoxy-11β-formyloxy-17α-hydroxy-6-hydroxyiminomethyl-3-methoxypregna-3,5 - dien - 20-one (prepared as described in Example 3) (1 g.) and sodium acetate (0.05 g.) in acetic anhydride (50 ml.) was heated under reflux for 2¾ hours under nitrogen. The solid obtained on pouring the cooled mixture into water was crystallised from chloroform-methanol to give 6-cyano-17α,21-diacetoxy-11β-formyloxy - 3 - methoxypregna-3,5-dien-20-one as feathery needles, M.P. 263.5° C., $[\alpha]_D^{22}$ −57.2° (c., 0.5 in chloroform)

$\lambda_{max.}^{EtOH}$ 282 m$\mu$ ($\epsilon$ 19,670)

$\nu_{max.}$ 2195, 1623 and 1588 cm.$^{-1}$.

The compound has claudogenic activity.

EXAMPLE 5

Preparation of 21-acetoxy-6-cyano-17α-hydroxy-3-methoxypregna-3,5,9(11)-trien-20-one

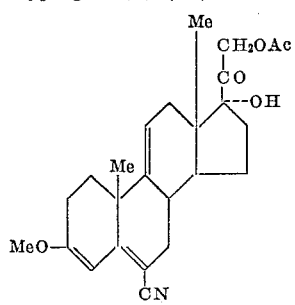

A solution of 21 - acetoxy - 6-formyl-17α-hydroxy-3-methoxypregna-3,5,9(11)-trien-20-one (3.65 g.), hydroxylamine hydrochloride (0.63 g.) and sodium acetate (1.25 g.) in ethanol (60 ml.) and water (25 ml.) was heated under reflux for 35 minutes. The mixture was diluted with water and the precipitated solid was crystallised from chloroform-methanol to give 21-acetoxy-17α-hydroxy-6-hydroxyiminomethyl-3-methoxypregna - 3,6,9(11)-trien-20-one as prisms, M.P. 226–234° C. decomp. $[\alpha]_D$ −133.4 (c., 1.22 in chloroform $\lambda_{max.}^{EtOH}$ 293 m$\mu$ ($\epsilon$ 20,490)

The foregoing oxime was acetylated by treatment with acetic anhydride and pyridine at room temperature for 2 days. 21-acetoxy-6-acetoxyiminomethyl-17α-hydroxy-3-methoxypregna - 3,5,9(11) - trien-20-one formed prisms from chloroform-methanol, M.P. 176° C. decomp. $[\alpha]_D$ −143.9 (c., 104 in chloroform)

$\lambda_{max.}^{EtOH}$ 223 m$\mu$ ($\epsilon$ 11,930) and 313 m$\mu$ ($\epsilon$ 20,170)

The foregoing product was heated under nitrogen at 160° C. for 2 minutes. Crystallisation of the residue gave 21 - acetoxy-6-cyano-17α-hydroxy-3-methoxypregna-3,5,9(11)-trien-20-one as rods, M.P. 212° C. decomp., $[\alpha]_D^{30}$ −95.7° (c., 0.55 in chloroform)

$\lambda_{max.}^{EtOH}$ 283 m$\mu$ ($\epsilon$ 17,740), $\nu_{max.}$ 2195, 1624 and 1592 cm$^{-1}$ The compound is of value as an intermediate in the preparation of substances having antiendotoxic and anti-inflammatory activity.

EXAMPLE 6

Preparation of 6-cyano-3-ethoxy-16α,17α-isopropylidenedioxy-pregna-3,5-dien-20-one

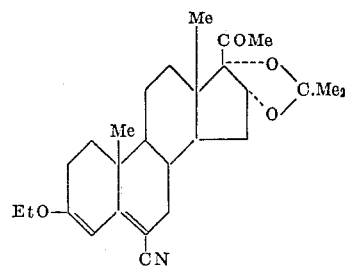

A solution of 3-ethoxy-6-formyl- 16α, 17α-isopropylidene-dioxypregna-3,5-dien-20-one (5 g.), sodium acetate (2.2 g.) and hydroxylamine hydrochloride (1.1 g.) in ethanol (37.5 ml.) and water (7.5 ml.) was heated under reflux for 35 minutes. The solid which separated from the cooled mixture was crystallised from ethanol to give 3-ethoxy-6-hydroxyimino-methyl-16α,17α-isopropylidenedioxypregna-3,5-dien-20-one as prisms, M.P. 219–224° C. decomp., $[\alpha]_D^{25}$ −135° (c., 0.85 in chloroform)

$\lambda_{max.}^{EtOH}$ 219 m$\mu$ ($\epsilon$ 8,970) and 294 m$\mu$ ($\epsilon$ 20,960)

The foregoing product was acetylated by heating it in acetic anhydride and pyridine at 100° C. for 1 hour. 6 - acetoxyiminomethyl - 3-ethoxy - 16α,17α - isopropylidenedioxypregna-3,5-dien-20-one formed needles from ethanol, M.P. 186–188° C., $[\alpha]_D^{25}$ −112° (c., 0.85 in chloroform)

$\lambda_{max.}^{EtOH}$ 224.5 m$\mu$ ($\epsilon$ 10,140) and 315 m$\mu$ ($\epsilon$ 19,680)

The foregoing product (2 g.) was heated to 195° C. until gas evolution ceased. The residue was crystallised from ethanol to give 6-cyano-3-ethoxy-16α,17α-isopropylidenedioxypregna-3,5-dien-20-one as needles, M.P. 223–226° C., $[\alpha]_D^{25}$ −71.2° (c., 0.65 in chloroform)

$\lambda_{max.}^{EtOH}$ 284 m$\mu$ ($\epsilon$ 19,520)

The last compound was also prepared from the 6-hydroxyiminomethyl derivative by heating it (2 g.) and anhydrous sodium acetate (0.25 g.) in acetic anhydride (35 ml) under reflux for 3 hours. The cooled mixture was poured into water and the precipitated solid was crystallised from ethanol to give the 6-cyano compound, M.P. 223–226° C.

The compound has anti-inflammatory, progestational and antiendotoxic activity.

EXAMPLE 7

Preparation of 17α-acetoxy-6-cyano-3-methoxypregna-3,5-dien-20-one

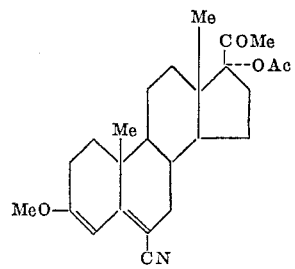

A solution of 17α-acetoxy-6-formyl-3-methoxypregna-3,5-dien-20-one (0.75 g.), hydroxylamine hydrochloride (0.14 g.) and anhydrous sodium acetate (0.28 g.) in ethanol (13 ml.) and water (3 ml.) was heated under reflux for 30 minutes. The solution was cooled, poured into water and the precipitated solid was crystallised from methanol to give *17α-acetoxy-6-hydroxyiminomethyl-3-methoxypregna-3,5-dien-20-one*, M.P. 175–180° C., $[\alpha]_D^{25}$ —204° (c., 1.0 in chloroform).

A solution of the foregoing oxime (0.5 g.) and anhydrous sodium acetate (0.06 g.) in acetic anhydride (9 ml.) was heated under reflux for 3 hours and poured into ice-water. The precipitated solid was crystallised from methanol to give *17α-acetoxy-6-cyano-3-methoxypregna-3,5-dien-20-one* as plates, M.P. 266.5° C., $[\alpha]_D$ —156.6° (c., 1.0 in chloroform)

$\lambda_{max.}^{EtOH}$ 282 mμ ($\epsilon$ =18,630)

The compound has progestational activity.

EXAMPLE 8

*Preparation of 17α-chlorethynyl-6-cyano-17β-hydroxy-3-methoxyoestra-3,5-diene*

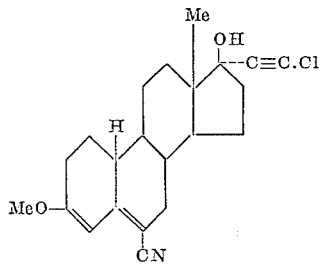

A solution of 17α - chlorethynyl - 3 - methoxyoestra - 2,5,(10-dien-17β-ol (specification No. 919,565( 2.1 g.) in dry dichloromethane (25 ml.) was added at 0° C. to a suspension of the complex prepared from dimethylformamide (2.3 ml.) and phosgene (1.6 g.) in dichloromethane (30 ml.), and the mixture was stirred at room temperature for 2 hours. After hydrolysis with aqueous sodium acetate, the product was isolated with ether and crystallised from methanol to give *17α-chlorethynyl-6-formyl-3-methoxyoestra-3,5-dien-17β-ol* as needles, M.P. 241° C., decomp. $[\alpha]_D^{25}$ —279° (c., 0.4 in ethanol)

$\lambda_{max.}^{EtOH}$ 219–220 mμ ($\epsilon$ 10,010) and 322 mμ ($\epsilon$ 16.500)

A solution of 17α-chlorethynyl-6-formyl-17β-hydroxy-3-methoxyoestra-3,5-diene (0.28 g.), hydroxylamine hydrochloride (0.28 g.) and sodium acetate (0.2 g.) in ethanol (8 ml.) and water (2 ml.) was heated under reflux for 35 minutes. The solid obtained on pouring the mixture into water was crystallised from aqueous methanol to give *17α-chlorethynyl-17β-hydroxy - 6 - hydroxyiminomethyl-3-methoxyoestra-3,5-diene* as rods, M.P. 140° C., decomp., $[\alpha]_D^{30}$ —323° (c., 0.25 in chloroform)

$\lambda_{max.}^{EtOH}$ 295 mμ ($\epsilon$ 21,290)

The foregoing oxime was acetylated by treatment with acetic anhydride and pyridine at 100° C. for 1 hour. The solid obtained on dilution with water was collected, washed and dried and heated, under nitrogen, to 160° C. for 2 minutes. The residue was crystallised from aqueous methanol to give *17α-chlorethynyl-6-cyano-17β-hydroxy-3-methoxyoestra-3,5-diene* as prisms, M.P. 250–259° C., decomp., $[\alpha]_D^{29}$ —289° (c., 0.15 in chloroform)

$\lambda_{max.}^{EtOH}$ 283 mμ ($\epsilon$ 18,480)

The compound has claudogenic and progestational activity.

EXAMPLE 9

*Preparation of 17α,20:20,21-bismethylenedioxy-6-cyano-3-ethoxypregna-3,5-dien-11-one*

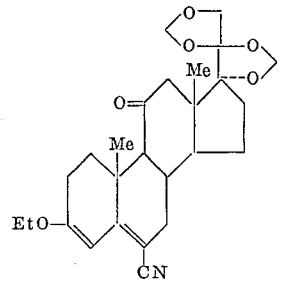

A mixture of 17α,20:20,21-bismethylenedioxy-3-ethoxy-6-formylpregna-3,5-diene-11-one (6 g.), hydroxylamine hydrochloride (1 g.) and sodium acetate (2 g.) in ethanol (200 ml.) and water (25 ml.) was heated under reflux for 1 hour. The solution was poured into water and the precipitated solid was collected, washed with aqueous ethanol and dried. It was then refluxed in acetic anhydride (50 ml.) containing sodium acetate (0.05 c.) for 3 hours. The cooled mixture was poured onto ice-water and the precipitated solid was crystallized from methanol to give *17α,20:20,21 - bismethylenedioxy - 6 - cyano - 3 - ethoxypregna-3,5-dien-11-one* having $\lambda_{max.}^{EtOH}$ 281 mμ ($\epsilon$ 19,500), $\nu_{max.}^{Nujol}$ 2230, 1640, 1600 cm.$^{-1}$ The compound may be converted into the corresponding corticoidal type by regeneration of the dihydroxyacetone side chain.

EXAMPLE 10

*Preparation of 17α-acetoxy-6-cyano-3-methoxy-16-methylenepregna-3,5-dien-20-one*

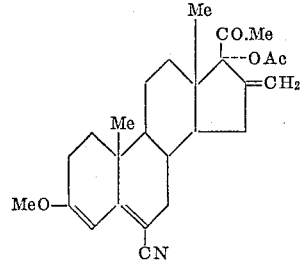

17α - acetoxy - 6 - formyl - 3 - methoxy - 16 - methylenepregna-3,5-dien-20-one (0.75 g.), hydroxylamine hydrochloride (0.14 g.) and sodium acetate (0.28 g.) were refluxed in ethanol (13.2 ml.) and water (3.3 ml.) for ½ hour. The solid obtained on pouring the mixture into water was crystallised from methanol to give *17α-acetoxy-6 - hydroxyiminomethyl - 3 - methoxy - 16 - methylenepregna-3,5 - dien - 20 - one* as prisms, M.P. 173–8° C., $[\alpha]_D^{30}$ —309° (c., 0.76 in chloroform)

$\lambda_{max.}^{EtOH}$ 294 mμ ($\epsilon$=20,220)

A solution of the foregoing product (0.5 g.) and sodium acetate (0.06 g.) in acetic anhydride (8.75 ml.) was heated under reflux for 3 hours. The mixture was poured into water and the precipitate was crystallised from methanol to give *17α-acetoxy-6-cyano-3-methoxy-16-methylenepregna-3,5-dien-20-one* as needles, M.P. 232° C., $[\alpha]_D^{30}$ —236° (c., 1.0 in chloroform)

$\lambda_{max.}^{EtOH}$ 281 mμ ($\epsilon$=18,660)

$\gamma_{max.}$ 2210, 1630 and 1595 cm.$^{-1}$.

The compound has progestational and anti-ovulatory properties.

EXAMPLE 11

*Preparation of 21-acetoxy-6-cyano-3-methoxypregna-3,5,17(20)-trien-11-one*

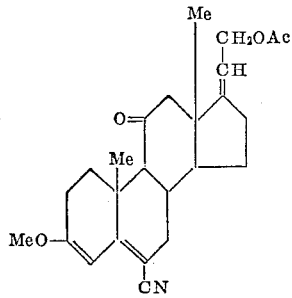

A solution of 21-acetoxy-6-formyl-3-methoxypregna-3,5,17(20)-trien-11-one (1 g.), sodium acetate (0.5 g.) and hydroxylamine hydrochloride (0.25 g.) in ethanol (10 ml.) and water (2 ml.) was heated under reflux for 40 minutes. The product obtained on pouring the mixture into water was washed, dried and heated under reflux for 3 hours in acetic anhydride (15 ml.) containing sodium acetate (0.08 g.) The cooled mixture was poured into ice-water, and the product crystallised to give *21-acetoxy-6 - cyano-3-methoxypregna-3,5,17(20)-trien-11-one* with $\lambda_{max}$. 282 m$\mu$ ($\epsilon$=19,550), $\gamma_{max}$. 2195, 1630 and 1590 cm.$^{-1}$.

EXAMPLE 12

*Preparation of β-(6-cyano-3-ethoxy-17β-hydroxyandrosta-3,5-dien-17α-yl)-propionic acid lactone*

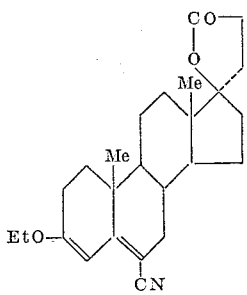

A solution of β - (3-ethoxy-6-formyl-17β-hydroxyandrosta-3,5-dien-17α-yl)-propionic acid lactone (1 g.), anhydrous sodium acetate (0.5 g.) and hydroxylamine hydrochloride (0.25 g.) in ethanol (10 ml.) and water (2 ml.) was heated under reflux for 45 minutes. The product obtained on pouring the mixture into water was washed, dried and heated under reflux for 3 hours in acetic anhydride (1.5 ml.) containing sodium acetate (0.1 g.) The cooled mixture was poured into ice-water, and the product crystallised to give *β-(6-cyano-3-ethoxy-17β-hydroxyandrosta-3,5-dien-17α-yl)-propionic acid lactone* with $\lambda_{max}$. 284 m$\mu$ ($\epsilon$=19,600), $\gamma_{max}$. 2225, 1635 and 1600 cm.$^{-1}$.

The compound has diuretic activity.

EXAMPLE 13

*Preparation of 6-cyano testololactone 3-enol methyl ether*

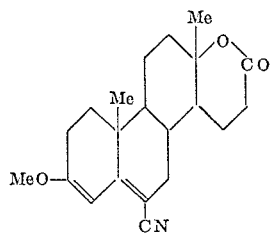

A solution of 6 - formyltestololactone 3-enol methyl ether (1.8 g.), sodium acetate (0.7 g.) and hydroxylamine hydrochloride (0.3 g.) in ethanol (30 ml.) and water (7 ml.) was heated under reflux for 45 minutes. The mixture was poured into water and the product crystallised to give *6-hydroxyiminomethyltestololactone 3-enol methyl ether*.

A solution of the foregoing oxime (1 g.) and anhydrous sodium acetate (0.075 g.) in acetic anhydride (15 ml.) was heated under reflux for 3 hours. The product obtained on pouring the mixture into water was crystallised to give *6-cyanotestololactone 3-enol methyl ether*, $\lambda_{max}$. 283 m$\mu$ ($\epsilon$=19,450), $\gamma_{max}$. 2230, 1635, 1595 cm.$^{-1}$.

EXAMPLE 14

*Preparation of 17α - acetoxy - 6 - cyano-16-ethylidene-3-methoxypregna-3,5-dien-20-one*

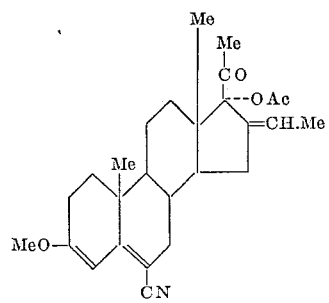

A solution of 17α - acetoxy-16-ethylidene-6-formyl-3-methoxypregna-3,5-dien-20-one (1.5 g.), sodium acetate (0.75 g.) and hydroxylamine hydrochloride (0.3 g.) in ethanol (30 ml.) and water (7 ml.) was heated under reflux for 35 minutes. The mixture was poured into water, and the product purified to give *17α - acetoxy - 16 - ethylidene - 6-hydroxyiminomethyl-3-methoxypregna-3,5-dien-20-one*.

A solution of the above compound (0.75 g.) and anhydrous sodium acetate (0.1 g.) in acetic anhydride (10 ml.) was heated under reflux for 2½ hours. The product obtained on pouring the mixture into water was crystallised, giving *17α - acetoxy - 6 - cyano-16-ethylidene-3-methoxypregna-3,5-dien-20-one*, $\lambda_{max}$. 284 m$\mu$ ($\epsilon$=19,500), $\gamma_{max}$. 2230, 1640, 1600 cm.$^{-1}$.

The compound has anti-fertility activity.

EXAMPLE 15

*Preparation of 6 - cyano - 3 - ethoxy-17β-propionoxy-17α-(prop-1'-ynyl)androsta-3,5-diene*

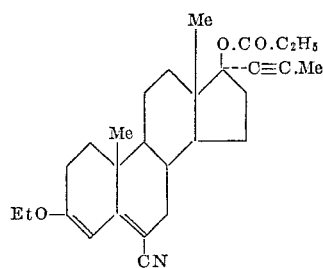

A solution of 3 - ethoxy-6-formyl-17β-propionoxy-17α-(prop-1' - ynyl)androsta-3,5-diene (0.75 g.), hydroxylamine hydrochloride (0.2 g.) and sodium acetate (0.4 g.) in ethanol (15 ml.) and water (4 ml.) was heated under reflux for 30 minutes. The mixture was poured into water, and the precipitate filtered and purified to give *3-ethoxy - 6 - hydroxyiminomethyl - 17β - propionoxy-17α-(prop-1'-ynyl)androsta-3,5-diene*.

The foregoing compound (0.5 g.) and anhydrous sodium acetate (0.1 g.) in acetic anhydride (10 ml.) was heated under reflux for 3 hours. The product obtained on pouring the mixture into water was crystallised, giving *6 - cyano - 3 - ethoxy - 17β - propionoxy - 17α - (prop-1' - ynyl)androsta - 3,5 - diene*, $\lambda_{max}$. 282 m$\mu$ ($\epsilon$, 19,200), $\lambda_{max}$. 2230, 1640 and 1600 cm.$^{-1}$.

The compound has progestational activity.

EXAMPLE 16

*Preparation of 6-cyano-11α,17β-diacetoxy-3-methoxy-androsta-3,5-diene*

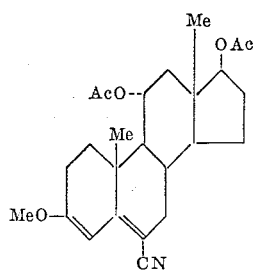

A solution of 11α,17β-diacetoxy-6-formyl-3-methoxy-androsta-3,5-diene (2.5 g.), sodium acetate (1 g.) and hydroxylamine hydrochloride (0.5 g.) in ethanol (30 ml.) and water (6 ml.) was heated under reflux for 45 minutes. The mixture was poured into water, and the precipitate of crude oxime was filtered, washed and dried. It was heated under reflux for 3 hours with acetic anhydride (25 ml.) containing sodium acetate (0.15 g.). The cooled mixture was poured into ice-water, and the precipitate crystallised giving *6-cyano-11α,17β-diacetoxy-3-methoxy-androsta-3,5-diene*, $\lambda_{max.}$ 283 m$\mu$ ($\epsilon$=19,480), $\gamma_{max.}$ 2230, 1635 and 1600 cm.$^{-1}$.

The compound has anabolic and androgenic activity.

EXAMPLE 17

*Preparation of ethyl 6-cyano-3-ethoxypregna-3,5,17(20)-trien-21-oate*

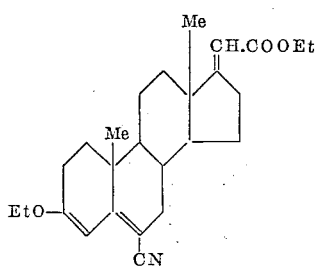

A solution of ethyl 3-ethoxy-6-formylpregna-3,5,17(20)-trien-21-oate (5 g., hydroxylamine hydrochloride (1 g.) and sodium acetate (2 g.) in ethanol (75 ml.) and water (15 ml.) was heated under reflux for 1 hour. The mixture was poured into water, and the precipitated crude oxime was filtered, washed and dried. It was then heated under reflux for 3 hours with acetic anhydride (50 ml.) containing sodium acetate (0.1 g.). The cooled mixture was poured into ice-water, and the precipitated solid was crystallised to give *ethyl 6-cyano-3-ethoxypregna-3,5,17(20)-trien-21-oate* with $\lambda_{max.}$ 281 m$\mu$ ($\epsilon$=18,800), $\gamma_{max.}$ 2230, 1635 and 1595 cm.$^{-1}$.

EXAMPLE 18

*Preparation of 17β-acetoxy-3-benzyloxy-6-cyanoandrosta-3,5-diene*

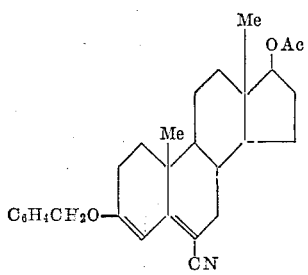

A solution of 17β-acetoxy-3-benzyloxy-6-formylandrosta-3,5-diene (1 g.), hydroxylamine hydrochloride (0.2 g.), and sodium acetate (0.5 g.) in ethanol (20 ml.) and water (5 ml.) was heated under reflux for 30 minutes. The mixture was poured into water, and the precipitate filtered and crystallised to give *17β-acetoxy-3-benzyloxy-6-hydroxyiminomethylandrosta-3,5-diene*.

A solution of the foregoing oxime (0.5 g.) and anhydrous sodium acetate (0.1 g.) in acetic anhydride (8 ml.) was heated under reflux for 3½ hours. The mixture was poured into water, and the product collected and crystallised to give 17β-acetoxy-3-benzyloxy-6-cyanoandrosta-3,5-diene, $\lambda_{max.}$ 283 m$\mu$ ($\epsilon$=19,000), $\gamma_{max.}$ 2230, 1635 and 1595 cm.$^{-1}$.

The compound has anabolic and androgenic activity.

EXAMPLE 19

*Preparation of 6-cyano-3-ethoxy-25D-spirosta-3,5-diene*

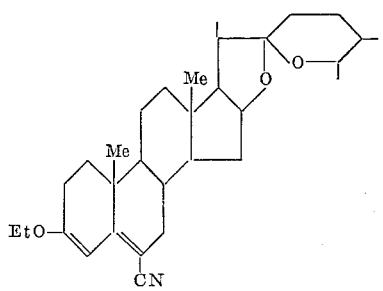

A solution of 3-ethoxy-6-formyl-25D-spirosta-3,5-diene (5 g.), sodium acetate (2.5 g.) and hydroxylamine hydrochloride (1.2 g.) in ethanol (40 ml.) and water (10 ml.) was heated under reflux for 45 minutes. The mixture was poured into water, and the product collected and crystallised to give *3-ethoxy-6-hydroxyiminomethyl-25D-spirosta-3,5-diene*.

A solution of the foregoing oxime (2 g.) and anhydrous sodium acetate (0.25 g.) in acetic anhydride (40 ml.) was heated under reflux for 3 hours. The mixture was poured into ice-water, and the product filtered and crystallised to give *6-cyano-3-ethoxy-25D-spirosta-3,5-diene* with $\lambda_{max.}$ 282 m$\mu$ ($\epsilon$=18,500), $\gamma_{max.}$ 2225, 1640 and 1600 cm.$^{-1}$.

EXAMPLE 20

*Preparation of 17β-acetoxy-6-cyano-3-ethoxy-2α-methylandrosta-3,5-diene*

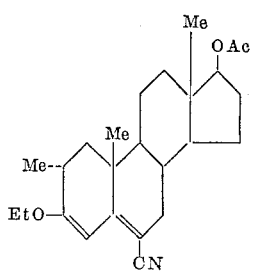

A solution of 17β-acetoxy-3-ethoxy-6-formyl-2α-methylandrosta-3,5-diene (1.5 g.), sodium acetate (0.75 g.) and hydroxylamine hydrochloride (0.3 g.) in ethanol (35 ml.) and water (8 ml.) was heated under reflux for 1 hour. The mixture was poured into water, and the product crystallised to give *17β-acetoxy-3-ethoxy-6-hydroxyiminomethyl-2α-methylandrosta-3,5-diene*.

A solution of this oxime (1 g.) and anhydrous sodium acetate (0.05 g.) in acetic anhydride (12 ml.) was heated under reflux for 3½ hours. The mixture was poured into water, and the product purified to give *17β-acetoxy-6-* cyano-3-ethoxy-2α-methylandrosta-3,5 - diene, $\lambda_{max}$ 281 mμ ($\epsilon$=18,500), $\gamma_{max}$ 2225, 1640 and 1600 cm.$^{-1}$.

The compound has anabolic and androgenic activity.

EXAMPLE 21

*Preparation of 6-cyano-16α,17α-cyclomethylene-3-methoxypregna-3,5-dien-20-one*

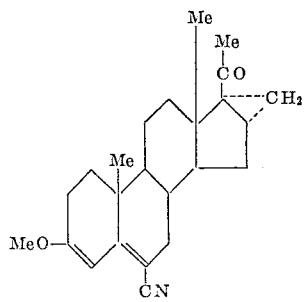

A solution of 16α,17α-cyclomethylene-6-formyl-3-methoxypregna-3,5-dien-20-one (1.1 g.), sodium acetate (0.45 g.) and hydroxylamine hydrochloride (0.25 g.) in ethanol (10 ml.) and water (1.5 ml.) was heated under reflux for 35 minutes. The cooled mixture was poured into water, and the product crystallised to give 16α,17α - cyclomethylene - 6 - hydroxyiminomethyl - 3-methoxypregna-3,5-dien-20-one.

A solution of the above oxime (0.5 g.) and anhydrous sodium acetate (0.05 g.) in acetic anhydride (7 ml.) was heated under reflux for 3 hours. The mixture was poured into water, and the product filtered and crystallised to give *6 - cyano-16α,17α-cyclomethylene-3-methoxypregna-3,5-dien-20-one*, with $\lambda_{max}$ 282 mμ ($\epsilon$=18,750), $\gamma_{max}$ 2225, 1630 and 1595 cm.$^{-1}$.

The compound has anti-fertility activity.

EXAMPLE 22

*Preparation of 17α-acetoxy-6-cyano-3-methoxy-16α-methylpregna-3,5-dien-20-one*

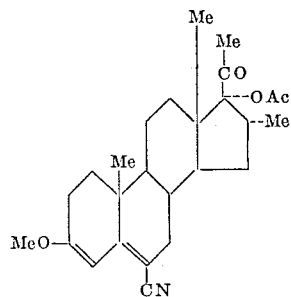

A solution of 17α-acetoxy-6-formyl-3-methoxy-16α-methylpregna-3,5-dien-20-one (0.8 g.), hydroxylamine hydrochloride (0.25 g.) and sodium acetate (0.5 g.) in ethanol (15 ml.) and water (4 ml.) was heated under reflux for 30 minutes. The mixture was poured into water, and the product filtered, washed and dried. Its solution in acetic anhydride (25 ml.) containing sodium acetate (0.1 g.) was heated under reflux for 3 hours, cooled, and the mixture poured into ice-water. Crystallisation of the product gave *17α-acetoxy-6-cyano-3-methoxy-16α-methylpregna-3,5-dien - 20 - one*, $\lambda_{max}$ 283 mμ ($\epsilon$=18,050), $\gamma_{max}$ 2220, 1630 and 1595 cm.$^{-1}$.

The compound has progestational and anti-fertility activity.

EXAMPLE 23

*Preparation of 20β-acetoxy-6-cyano-3-ethoxypregna-3,5-diene*

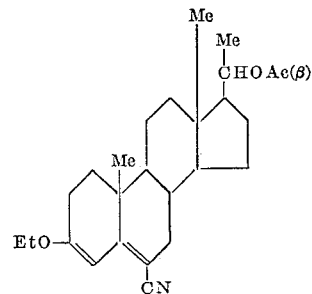

A solution of 20β-acetoxy-3-ethoxy-6-formylpregna-3,5-diene (2 g.), sodium acetate (1 g.) and hydroxylamine hydrochloride (0.5 g.) in ethanol (50 ml.) and water (10 ml.) was heated under reflux for 35 minutes. The product obtained on pouring the mixture into water was crystallised to give *20β-acetoxy-3-ethoxy-6-hydroxyiminomethylpregna-3,5-diene*.

The solution of the above oxime (1 g.) and anhydrous sodium acetate (0.1 g.) in acetic anhydride (18 ml.) was poured into water, and the product filtered and crystallised to give *20β-acetoxy-6-cyano-3-ethoxypregna-3,5-diene*, $\lambda_{max}$ 284 mμ ($\epsilon$=19,500), $\gamma_{max}$ 2235, 1635 and 1595 cm.$^{-1}$.

EXAMPLE 24

*Preparation of 6-cyano-3-ethoxy-17β-proprionoxy-17α-vinylandrosta-3,5-diene*

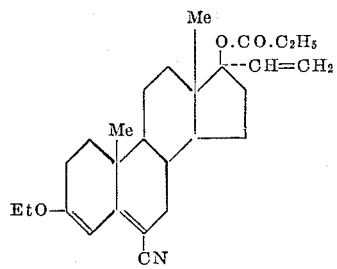

A solution of 3-ethoxy-6-formyl-17β-propionoxy-17α-vinylandrosta-3,5-diene (3 g.), hydroxylamine hydrochloride (0.6 g.) and sodium acetate (1.5 g.) in ethanol (60 ml.) and water (15 ml.) was heated under reflux for 1 hour. The mixture was poured into water, and the precipitated solid was filtered, washed and dried. Its solution in acetic anhydride (30 ml.) containing sodium acetate (0.1 g.) was heated under reflux for 3½ hours, cooled, and the mixture poured into cold water. The product was crystallised to give *6-cyano-3-ethoxy-17β-propionoxy-17α-vinylandrosta-3,5-diene*, $\lambda_{max}$ 281 mμ ($\epsilon$=19,000), $\gamma_{max}$ 2220, 1640 and 1590 cm.$^{-1}$.

The compound has anabolic and androgenic activity.

EXAMPLE 25

*Preparation of 17β-acetoxy-6-cyano-3-ethoxy-17α-methylandrosto-3,5-diene*

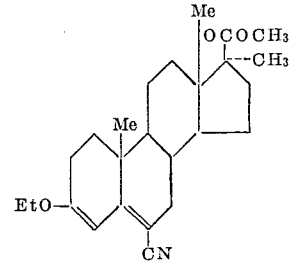

A solution of 17β-acetoxy-3-ethoxy-6-formyl-17α-methylandrosta-3,5-diene (5 g.) and hydroxylamine hydrochloride (0.95 g.) in pyridine (10 ml.) was warmed slightly and left at room temperature for 12 hours. The mixture was poured into water, and the precipitate filtered and purified to give *17β-acetoxy-3-ethoxy-6-hydroxyiminomethyl-17α-methyl-androsta-3,5-diene*, M.P. 182.5° C., $[\alpha]_D^{29}$ —200° (c., 0.8 in dioxan), $\lambda_{max.}^{EtOH}$ 219.5 mμ (ε 8,980) and 295 mμ (ε 21,110)

The foregoing compound (3 g.) and anhydrous sodium acetate (0.6 g.) in acetic anhydride (100 ml.) was heated under reflux for 3 hours. The product obtained on pouring the mixture into water was crystallised, giving *17β-acetoxy - 6-cyano-3-ethoxy-17α-methylandrosta-3,5-diene*, M.P. 164–165° C., $[\alpha]_D^{27}$ —130° (ε, 1.0 in chloroform), $\lambda_{max.}^{EtOH}$ 284 mμ (ε 17,330)

$\nu_{max.}$ 2193, 1631 and 1591 cm.$^{-1}$.

The compound has anabolic/androgenic activity.

EXAMPLE 26

*Preparation of 17α-acetoxy-3-ethoxy-6-cyanopregna-3,5,7-trien-20-one*

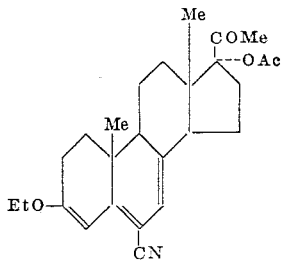

A solution of 17α-acetoxy-3-ethoxy-6-formylpregna-3,5,7-trien-20-one (1.07 g.), sodium acetate (0.44 g.) and hydroxylamine hydrochloride (0.22 g.) in ethanol (7.5 ml.) and water (1.5 ml.) was heated under reflux for 35 minutes. The mixture was filtered whilst hot, and the solid which separated from the cooled filtrate was crystallised from chloroform-ethanol to give *17α-acetoxy-3-ethoxy-6-hydroxyiminomethylpregna-3,5,7-trien-20-one* as prisms, M.P. 241–244° C. decomp., $[\alpha]_D^{31}$ —55.7° (c., 0.95 in chloroform) $\lambda_{max.}$ 240.5 mμ (ε 14,130) and 342 mμ (ε 18,150), $\gamma_{max.}^{CH_2Cl_2}$ 3586, 1736, 1731, 1714, 1644, 1614 and 1590 cm$^{-1}$ (a) The foregoing product was acetylated in acetic anhydride and pyridine at 25° C. for 16 hours. *17α-acetoxy-6-acetoxyiminomethyl-3-ethoxypregna-3,5,7-trien-20-one* formed prisms from ethanol, M.P. 160–164° C. decomp.

$\lambda_{max.}^{EtOH}$ 240 mμ (ε = 13,680) and 362 mμ (ε = 16,340)

The foregoing compound was heated at 175° C. until evolution of gases ceased. The residue was crystallised from ethanol to give *17α-acetoxy-3-ethoxy-6-cyanopregna-3,5,7-trien-20-one*, M.P. 215–216° C., $[\alpha]_D^{29}$ —65° (c., 1.1 in CHCl$_3$), $\lambda_{max.}^{EtOH}$ 227.5 mμ (ε = 8,720) and 350 mμ (ε = 15,800)

$\nu_{max.}$ 2195, 1635 mμ, 1611 cm.$^{-1}$.

(b) A mixture of 17α-acetoxy-3-ethoxy-6-hydroxyiminomethylpregna-3,5,7-trien-20-one (0.6 g.), anhydrous sodium acetate (0.075 g.) and acetic anhydride (10.5 ml.) was heated under reflux for 3 hours. The cooled mixture was poured into ice-water and the precipitated solid crystallised from ethanol to give *17α-acetoxy-3-ethoxy-6-cyanopregna-3,5,7-trien-20-one* as needels, M.P. 217–218° C.

The starting material for Example 26 was prepared as follows:

17α-acetoxypregn-5-en-3β-ol-20-one (3.0 g.) in dry benzene (150 ml.) was treated with aluminum tert.-butoxide (3.0 g.) followed by purified p-benzoquinone (4.5 g.) and left at room temperature for 2 days. The mixture was then washed with 5% potassium hydroxide solution, water to neutrality, dried and evaporated in vacuo to give a gum which upon crystallisation from acetone-hexane gave *17α-acetoxypregna-4,6-diene-3,20-dione* as rods, M.P. 210–222° C., $[\alpha]_D^{18}$ +14.5° (c., 10.2 in chloroform), $\lambda_{max.}^{EtOH}$ 283 mμ (ε 20,785)

$\gamma_{max.}^{CH_2Cl_2}$ 1732, 1715, 1658, 1619, 1583 cm.$^{-1}$

The foregoing compound (1.12 g.) in dry benzene (25 ml.) with triethylorthoformate (1 ml.) and ethanol (1 ml.) was treated with toluene-p-sulphonic acid (50 mg.) and heated under reflux for 2 hours. Pyridine (1 ml.) was then added, the mixture twice washed with water (25 ml.), dried and evaporated in vacuo. The gummy product was purified from ethanol and then acetone to give *17α - acetoxy - 3 - ethoxypregna-3,5,7-trien-20-one* as rods, M.P. 216–222° C., $[\alpha]_D^{24}$ —167.3° (c., 0.75 in chloroform containing 0.2% pyridine), $\lambda_{max.}^{EtOH}$ 214–215 mμ (ε 7,388), 322 mμ (ε 18,590)

and $\lambda_{inf}^{EtOH}$ 335 mμ (ε 13,790)

$\gamma_{max.}^{CCl_4}$ 1743, 1722, 1645, 1620 cm.$^{-1}$

A mixture of dimethylformamide (1.6 ml.) and ethylene dichloride (6.6 ml.) was cooled to 0° C. and treated dropwise whilst stirring during 15 minutes, with a solution of phosgene (13.3 ml. of 10%-redistilled ethylene dichloride). The mixture was stirred a further 10 minutes and a solution of 17α-acetoxy-3-ethoxypregna-3,5,7-trien-20-one (1.7 g.) in ethylene dichloride (8 ml.) added. The mixture was allowed to attain room temperature whilst stirring for 2 hours. It was then poured into a mixture of sodium acetate (2.7 g.) in water (4 ml.) and methanol (16 ml.), diluted with ether, the third layer washed with sodium hydrogen carbonate solution and this with water to neutrality. After drying, the solvents were removed under reduced pressure and the residue crystallised from ethanol to give *17α - acetoxy - 3 - ethoxy-6-formylpregna-3,5,7-trien-20-one* as needles, M.P. 184–189° C., $[\alpha]_D^{24}$ —56.7° (c., 1.05 in chloroform)

$\lambda_{max.}^{EtOH}$ 218 mμ (ε 10,960), 272 mμ (ε 10,620) and 383 mμ (ε 12,630)

$\gamma_{max.}^{CCl_4}$ 1742, 1722, 1680, 1663, 1644 and 1601 cm.$^{-1}$

EXAMPLE 27

*Preparation of 21-acetoxy-6-cyano-11β,17α-dihydroxy-3-methoxypregna-3,5-dien-20-one*

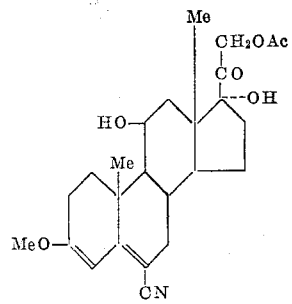

A solution of 21-acetoxy-11β,17α-dihydroxy-6-formyl-3-methoxypregna-3,5-dien-20-one (1.15 g.), hydroxylamine hydrochloride (0.19 g.) and sodium acetate (0.39 g.) in ethanol (15 ml.) and water (5 ml.) was heated under reflux for 35 minutes. The solid obtained on pouring the mixture into water was crystallised from aqueous methanol to give *21-acetoxy-11β,17α-dihydroxy-6-hydroxyiminomethyl-3-methoxypregna-3,5-dien-20-one* as rods, M.P. 170° C., $[\alpha]_D^{27}$ —25.1° (c., 0.4 in ethanol), $\lambda_{max.}^{EtOH}$ 213 mμ (ε 10,050) and 296 mμ (ε 21,090)

The foregoing product was acetylated by heating it with acetic anhydride and pyridine at 100° C. for 70 minutes. The solid obtained on dilution with water was collected, washed with water, dried and heated under nitrogen to 170° C. for 2 minutes. The residue was crystallised from aqueous methanol to give *21-acetoxy-6-cyano - 11β,17α - dihydroxy-3-methoxypregna-3,5-dien-20-one* as blades, M.P. 241° C., $[\alpha]_D^{26}$ —6.75° (c., 0.3 in chloroform), $\lambda_{max.}^{EtOH}$ 282 m$\mu$ ($\epsilon$ 19,560)

The compound has anti-endotoxic and anti-inflammatory properties.

EXAMPLE 28

*Preparation of 21-acetoxy-6-cyano-17α-hydroxy-3-methoxypregna-3,5-diene-11,20-dione*

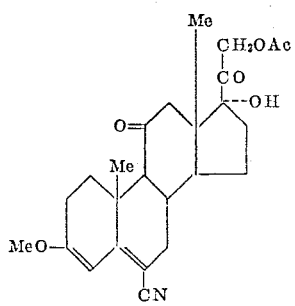

A solution of 21-acetoxy-6-formyl-17α-hydroxy-3-methoxypregna-3,5-diene-11,20-dione (10 g.), hydroxylamine hydrochloride (1.67 g.) and sodium acetate (3.34 g.) in ethanol (150 ml.) and water (50 ml.) was heated under reflux for 35 minutes. The cooled solution was poured into water and the precipitated solid was collected, washed with water and dried. It was acetylated with acetic anhydride and pyridine at 100° C. for 1 hour. The solid obtained on dilution with water was collected, washed with water, dried and heated, under nitrogen, to 180° C. for 2 minutes. Crystallisation of the residue from aqueous methanol gave *21-acetoxy-6-cyano-17α-hydroxy-3-methoxypregna-3,5-diene-11,20-dione* as prisms, M.P. 215.5° C., $[\alpha]_D^{29}$ —5.6° (c., 2.05 in chloroform), $\lambda_{max.}^{EtOH}$ 283 m$\mu$ ($\epsilon$ 18,250)

The compound has anti-inflammatory properties.

EXAMPLE 29

*Preparation of 6-cyano-17α,21-diacetoxy-3-methoxypregna-3,5-dien-20-one*

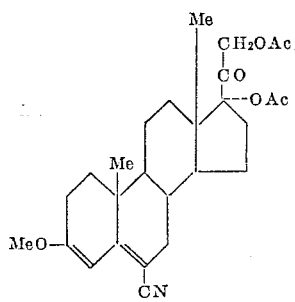

The starting material for this example was prepared as follows:

A suspension of 17α,21-diacetoxypregn-4-ene-3,20-dione (Turner, Jour. Amer. Chem. Soc., 1953, 75, 3489) (10.45 g.) and toluene-p-sulphonic acid (0.5 g.) in dry tetrahydrofuran (100 ml.), methanol (10 ml.) and methyl orthoformate (10 ml.) was stirred at room temperature for 30 minutes. The mixture was neutralised with pyridine, diluted with water and the product was extracted into ether.

Evaporation of the washed and dried extract left a gum which was crystallised from dichloromethane-methanol containing a trace of pyridine to give *17α,21-diacetoxy-3-methoxypregna-3,5-dien-20-one* as blades, M.P. 144° C., $[\alpha]_D^{28}$ —128° (c., 0.55 in chloroform), $\lambda_{max.}^{EtOH}$ 240 m$\mu$ ($\epsilon$ 18,310)

A solution of the foregoing product (5.35 g.) in dichloromethane (15 ml.) was added at 0° C. to a suspension of the Vilsmeier reagent prepared from phosphoryl chloride (1.4 ml.) and dimethylformamide (4.4 ml.) in dichloromethane (25 ml.) and the mixture was stirred at 0° C. for 1¾ hours. After the addition of 10% aqueous sodium acetate (100 ml.) the product was isolated with ether and crystallised from methanol to give *17α,21-diacetoxy - 6 - formyl-3-methoxypregna-3,5-dien-20-one* as plates, M.P. 177° C., $[\alpha]_D^{25}$ —131° (c., 1.0 chloroform), $\lambda_{max.}^{EtOH}$ 219.5 m$\mu$ ($\epsilon$ 9,880) and 321 m$\mu$ ($\epsilon$ 14,410)

A solution of the foregoing product (2 g.), hydroxylamine hydrochloride (0.3 g.) and sodium acetate (0.6 g.) in ethanol (30 ml.) and water (8 ml.) was heated under reflux for 40 minutes. The precipitate obtained on pouring the mixture into water was crystallised from methanol to give *17α,21-diacetoxy-6-hydroxyiminomethyl-3-methoxypregna-3,5-dien-20-one* as needles, M.P. 250° C., $[\alpha]_D^{27}$ —181° (c., 1.0 in chloroform), $\lambda_{max.}^{EtOH}$ 294 m$\mu$ ($\epsilon$ 20,160) and 218.5 m$\mu$ ($\epsilon$ 9,100)

A solution of the foregoing oxime (1.3 g.) and anhydrous sodium acetate (0.2 g.) in acetic anhydride (20 ml.) was heated under reflux and under nitrogen for 2¾ hours. The solid which separated on cooling was crystallised from methanol to give *6-cyano-17α,21-diacetoxy-3-methoxypregna-3,5-dien-20-one* as needles, M.P. 253° C., $[\alpha]_D^{27}$ —127° (c., 1.3 chloroform), $\lambda_{max.}^{EtOH}$ 281 m$\mu$ ($\epsilon$ 19,140)

The compound is of value as an intermediate for the preparation of cortical steroid types.

We claim:

1. A process for the preparation of a 3-enol ether of a 6-cyano-4-oxo-Δ⁴-steriod having in Rings A and B of the steroid nucleus the structure

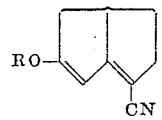 (I)

where R is an alkyl, cycloalkyl or aralkyl radical containing up to 11 carbon atoms which process comprises reacting the corresponding 3-enol ether of a 6-formyl-3-oxo-Δ⁴-steroid, having in Rings A and B of the steroid nucleus the structure

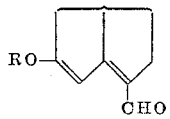 (II)

where R has the same meaning as above, with hydroxylamine to form an oxime having in Rings A and B of the steroid nucleus the structure

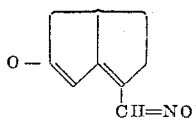 (III)

where R has the same meaning as above, and treating the oxime with a dehydrating agent.

2. A process as claimed in claim 1 wherein the 3-enol ether of a 6-formyl-3-oxo-Δ⁴-steroid is reacted with a slight excess over a molar equivalent of hydroxyamine hydrochloride and sodium acetate in an aqueous lower aliphatic alcohol as solvent to form the corresponding oxime.

3. A process as claimed in claim 1 wherein the oxime is converted into the corresponding 3-enol ether of a 6-cyano-3-oxo-Δ⁴-steroid by contacting with a dehydrating agent consisting of an acid anhydride under conditions to form an acyloxyiminomethyl enol ether having the partial structure

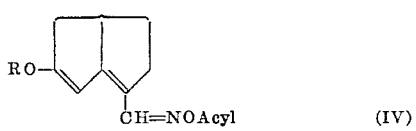

(IV)

where R has the same meaning as above and heating to eliminate the elements of the corresponding acid.

4. A process as claimed in claim 3 wherein the acyloxyiminomethyl enol ether is heated in the dry state in an inert atmosphere.

5. A process as claimed in claim 1 wherein the oxime is converted directly into the corresponding 3-enol ether of a 6-cyano-3-oxo-$\Delta^4$-steroid by heating under reflux with an acid anhydride in an inert atmosphere in the presence of a small quantity of an alkali metal acetate.

6. 3-enol ethers of 6-cyano-3-oxo-$\Delta^4$-steroids of the androstane, 19-norandrostane, pregnane and 19-norpregnane series having in Rings A and B of the steroid nucleus the structure

(I)

where R is an alkyl, aralkyl or cycloalkyl radical containing up to 11 carbon atoms.

7. 17β-acetoxy-6-cyano-3-methoxyandrosta-3,5-diene.
8. 17β-acetoxy-6-cyano-3-methoxyoestra-3,5-diene.
9. 21 - acetoxy - 6 - cyano - 11β - formyloxy - 17α - hydroxy-3-methoxypregna-3,5--dien-20-one.
10. 6 - cyano - 17α,21 - diacetoxy - 11β - formyloxy - 3 - methoxypregna-3,5-dien-20-one.
11. 21-acetoxy-6-cyano - 17α - hydroxy-3-m-methoxypregna-3,5,9(11)-trien-20-one.
12. 6-cyano - 3 - ethoxy-16α, 17α-isopropylidenedioxypregna-3,5-dien-20-one.
13. 17α-acetoxy-6-cyano - 3 - methoxypregna-3,5-dien-20-one.
14. 17α - chlorethynyl - 6 - cyano - 17β - hydroxy - 3 - methoxyoestra-3,5-diene.
15. 17α - acetoxy - 6 - cyano - 3 - methoxy - 16-methylenepregna-3,5-dien-20-one.
16. 21 - acetoxy - 6 - cyano - 3 - methoxypregna - 3,5,17(20)-trien-11-one.
17. β - (6 - cyano - 3 - ethoxy - 17β - hydroxyandrosta-3,5-dien-17α-yl)-propionic acid lactone.
18. 6 - cyano - 3 - ethoxy - 17β - propionoxy - 17α-(prop-1'-ynyl)-androsta-3,5-diene.
19. 6 - cyano - 3 - ethoxy - 25D - spirosta - 3,5-diene.
20. 17β-acetoxy - 6 - cyano - 3 - ethoxy - 2α-methylandrosta-3,5-diene.
21. 6 - cyano - 16α, 17α - cyclomethylene - 3 - methoxypregna-3,5-dien-20-one.
22. 17α - acetoxy - 6 - cyano - 3 - methoxy - 16α-methylpregna-3,5-dien-20-one.
23. 17β - acetoxy - 6 - cyano - 3 - ethoxy - 17α-methylandrosta-3,5-diene.
24. 17α - acetoxy - 3 - ethoxy - 6 - cyanopregna - 3,5,7-trien-20-one.

25. 21 - acetoxy - 6 - cyano - 11β, 17α - dihydroxy-3-methoxypregna-3,5-dien-20-one.
26. 21 - acetoxy - 6 - cyano - 17α - hydroxy - 3 - methoxypregna-3,5-diene-11,20-dione.
27. 6 - cyano - 17α, 21 - diacetoxy - 3 - methoxypregna-3,5-dien-20-one.
28. A compound of the formula

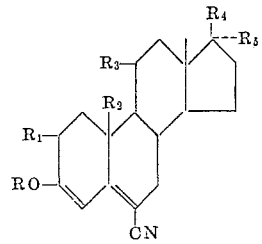

wherein
R is an alkyl, aralkyl, or cycloalkyl radical containing up to 11 carbon atoms,
$R_1$ is hydrogen or methyl,
$R_2$ is hydrogen or methyl,
$R_3$ is hydrogen, oxo, hydroxy or lower alkanoyloxy,
$R_4$ is hydroxy or lower alkanoyloxy, and
$R_5$ is hydrogen, lower alkyl, lower alkenyl, lower alkynyl or lower haloalkynyl.

29. A compound of the formula

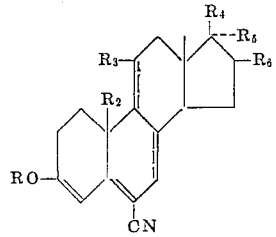

wherein
R is an alkyl, aralkyl or cycloalkyl radical containing up to 11 carbon atoms,
$R_2$ is hydrogen or methyl,
$R_3$ is oxo, hydrogen, hydroxy or lower alkanoyloxy,
$R_4$ is —COCH$_3$, —COCH$_2$OH, —COCH$_2$O(lower alkanoyl, =CHCH$_2$O(lower alkanoyl), =CHCOO (lower alkyl) or —CH(β-lower alkanoyloxy)CH$_3$
$R_5$ is hydrogen, hydroxy or lower alkanoyloxy, and
$R_6$ is hydrogen, lower alkyl or lower alkylidene, or
$R_5$ and $R_6$ together are 16α,17α-isopropylidenedioxy or 16α17α-cyclomethylene,
and wherein the broken line between positions 7 and 8 represents an optional double bond and the broken line between positions 9 and 11 represents an optional double bond when $R_3$ is a single hydrogen atom.

No references cited.

ELBERT L. ROBERTS, *Acting Primary Examiner.*